United States Patent [19]

Hoover

[11] Patent Number: 4,886,525
[45] Date of Patent: Dec. 12, 1989

[54] SYSTEM FOR IMPROVING CARBONATION IN POST-MIX DISPENSER CARBONATORS

[75] Inventor: George H. Hoover, Marietta, Ga.

[73] Assignee: The Coca-Cola Company, Atlanta, Ga.

[21] Appl. No.: 153,624

[22] Filed: Feb. 8, 1988

Related U.S. Application Data

[62] Division of Ser. No. 57,574, Jun. 2, 1987, Pat. No. 4,745,853.

[51] Int. Cl.⁴ .............................................. B01D 19/00
[52] U.S. Cl. .......................................... 55/55; 55/271; 55/21
[58] Field of Search ..................... 55/55, 21, 160, 164, 55/170, 189, 271; 261/DIG. 7, 27, 52; 99/323.1

[56] References Cited

U.S. PATENT DOCUMENTS 4,259,360 3/1981 Venetucci et al. ...................... 55/55
4,518,541 5/1985 Harris ........................... 261/DIG. 7

FOREIGN PATENT DOCUMENTS 2378548 8/1978 France .................................... 55/164
2157963 11/1985 United Kingdom ......... 261/DIG. 7

Primary Examiner—Bernard Nozick
Attorney, Agent, or Firm—Thomas R. Boston; W. Dexter Brooks

[57] ABSTRACT

A system for improving carbonation in post-mix beverage dispenser carbonators, including the method of automatically venting the headspace in a carbonator tank to atmosphere at predetermined times and for a predetermined length of time. This system eliminates most of the air from the headspace and provides a significant improvement in carbonating efficiency, in-line carbonation and in cup carbonation.

12 Claims, 4 Drawing Sheets

SYSTEM FOR IMPROVING CARBONATION IN POST-MIX DISPENSER CARBONATORS

This is a division of application Ser. No. 057,574 filed on June 2, 1987, now U.S. Pat. No. 4,745,853.

BACKGROUND OF THE INVENTION

1. Field of the Invention

This invention relates to carbonators used in post-mix beverage dispensers and in particular to a system for improving carbonation efficiency, in-line carbonation and cup carbonation.

2. Background

Standard carbonators used in post-mix beverage dispensers are well-known, and include a carbonation tank for holding a quantity of water with a headspace containing $CO_2$ gas under pressure (of from about 50–100 psi, for example). When the water level drops below a predetermined lower level, as sensed by level sensors (for example, such as when the dispensing valves to which the carbonator is connected have withdrawn a certain quantity of carbonated water, such as 16 ounces) the water pump is turned on and water is fed into the tank under pressure to bring the water level back up to an upper level and in such a way as to provide contact between the water and the $CO_2$ to enhance carbonation. The carbonated water is drawn from the tank through a dip tube having an inlet adjacent to the bottom of the tank. The carbonator tank also includes a pressure relief valve, such as a 100-pound valve (psi) of a 120-pound valve.

A completely different type of carbonator is used at bottling plants. Such bottling plant carbonators are much larger and more expensive. Such carbonator systems include means for cooling the water to be carbonated and for providing large surface areas of water. In addition, the water is first fed through a deaerator (to remove air from the water) before the water enters the carbonator.

SUMMARY OF THE INVENTION

A system for improving carbonation in a post-mix beverage dispenser type of carbonator, comprising the steps of automatically venting the headspace in the carbonator tank to atmosphere at predetermined times and for a predetermined length of time to eliminate at least most of the air that has accumulated in the headspace. It has been found that this elimination of air from the headspace results in a significant improvement in carbonation efficiency, in in-line carbonation, and in cup carbonation.

The predetermined times at which the vent is opened are preferably certain times during the day, such as twice a day at 3:00 p.m. and 3:00 a.m. Alternatively, the predetermined times can be every so many cycles (times the pump is turned on), such as once every "x" number of cycles, wherein "x" is chosen from the range of from about 50 to 500. The predetermined length of time that the vent is opened is preferably from one to five seconds, during which time the $CO_2$ line remains open to the $CO_2$ source.

It is an object of the present invention to provide a system to improve carbonation in post-mix dispenser carbonators including to improve carbonator efficiency, in-line carbonation and cup carbonation.

It is another object of this invention to improve carbonation in a post-mix beverage dispenser carbonator by automatically venting the headspace in the carbonator tank to atmosphere at predetermined times for a predetermined length of time.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENTS

Figure 1:
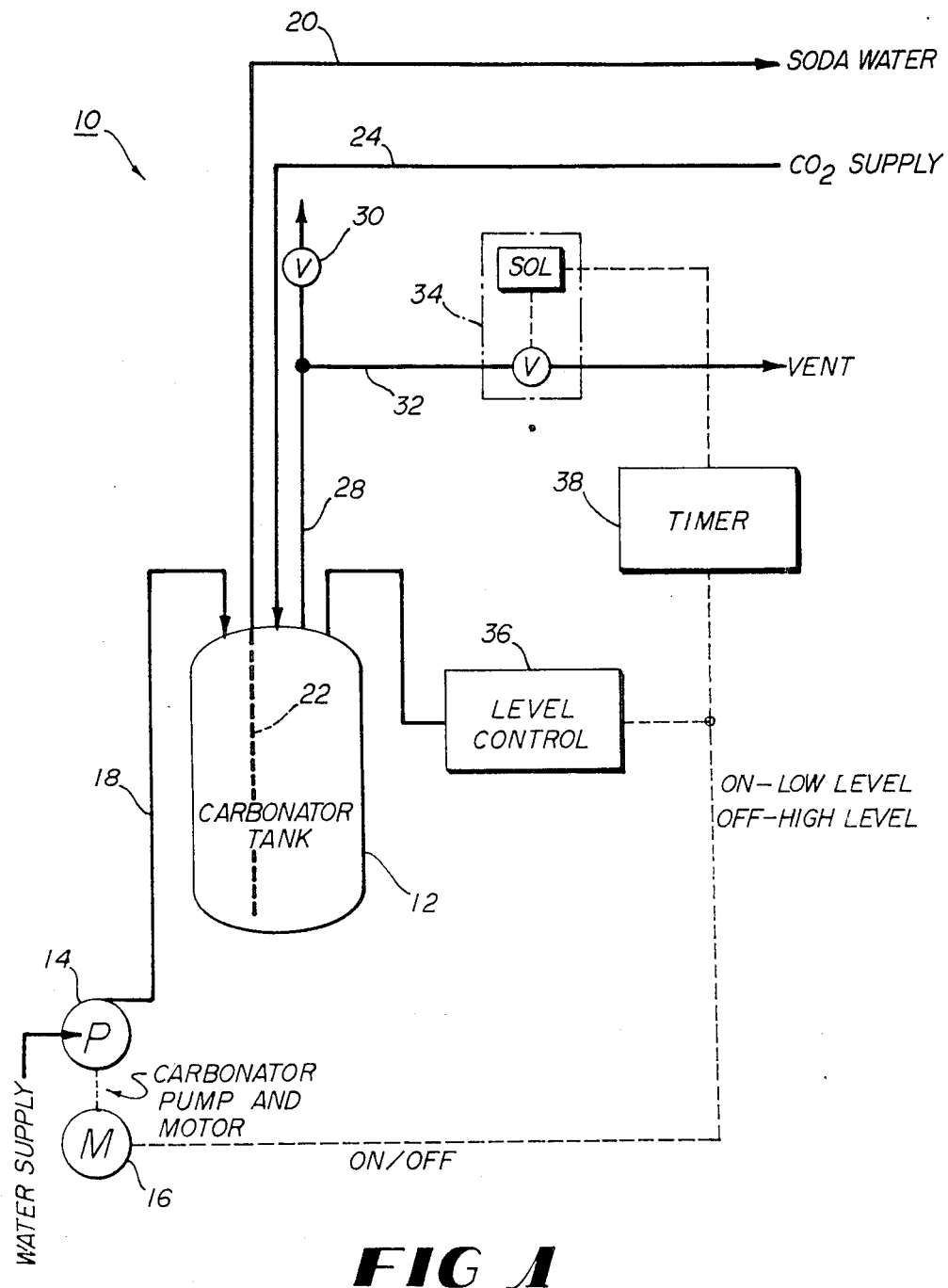
FIG. 1 is a partly diagrammatic, partly schematic view of the automatic carbonator venting system of the present invention.

With reference now to the drawings, FIG. 1 shows the automatic carbonator venting system 10 of the preferred embodiment of the present invention.

The system 10 includes a carbonator tank 12, a water pump 14 driven by a motor 16 for pumping water under pressure into the tank 12 through a water line 18, a carbonated water outlet line 20 connected to a dip tube 22, a $CO_2$ inlet line 24 connected to a $CO_2$ source (not shown), a pressure relief line 28 having a pressure relief valve 30, an automatic vent line 32 connected to said pressure relief line 28, a solenoid operated valve 34 in said line 32, a level sensing means 36 to turn on the motor 16 when the water level drops to the lower level and to turn it off when the level again reaches the upper level, and a timer means 38 for opening the valve 34 at predetermined times and for a predetermined length of time. For example, in a preferred embodiment the valve 34 is opened twice a day at 3:00 p.m. and 3:00 a.m. and for a length of time of from one to five seconds, preferably three seconds.

Alternatively, the timer means 38 can include a cycle counter for counting every time the motor 16 is turned on and for opening the valve 34 every time the motor 16 has been turned on a predetermined number of times. For example, the valve 34 can be opened every "x" number of cycles; "x" is preferably chosen from the range 50 to 500. One preferred embodiment opens the valve 34 every 100 cycles for two to three seconds.

Any standard, well-known pump, motor, valves, level sensing means, and timer (or cycle counter) can be used. A valve is not shown on the soda water line 20; the valve that controls this flow is the beverage dispenser valve assembly (not shown) on a beverage dispenser (not shown). Any known beverage dispenser and valve assembly can be used.

The carbonator tank is filled with water up to a level between an upper and a lower level. The headspace above the water level contains $CO_2$ gas at a pressure of, for example, 100 psi.

It has been found that, assuming no malfunction of equipment, carbonation values drop as the effective $CO_2$ pressure decreases due to an influx of air into the carbonator headspace. Incoming water supplies typically carry undissolved air. The carbonator headspace acts as an accumulator for this entrained air. It has further been found that varying amounts of air, up to 30%, have been found in the headspace.

During two months of testing at one city, the levels for three accounts were:

|  | Max. | Min. | Average |
|---|---|---|---|
| Account A | 22.3% | 9.1% | 19.2% |
| Account B | 28.7% | 11.6% | 20.2% |
| Account C | 29.7% | 7.7% | 17.0% |

Figure 2:
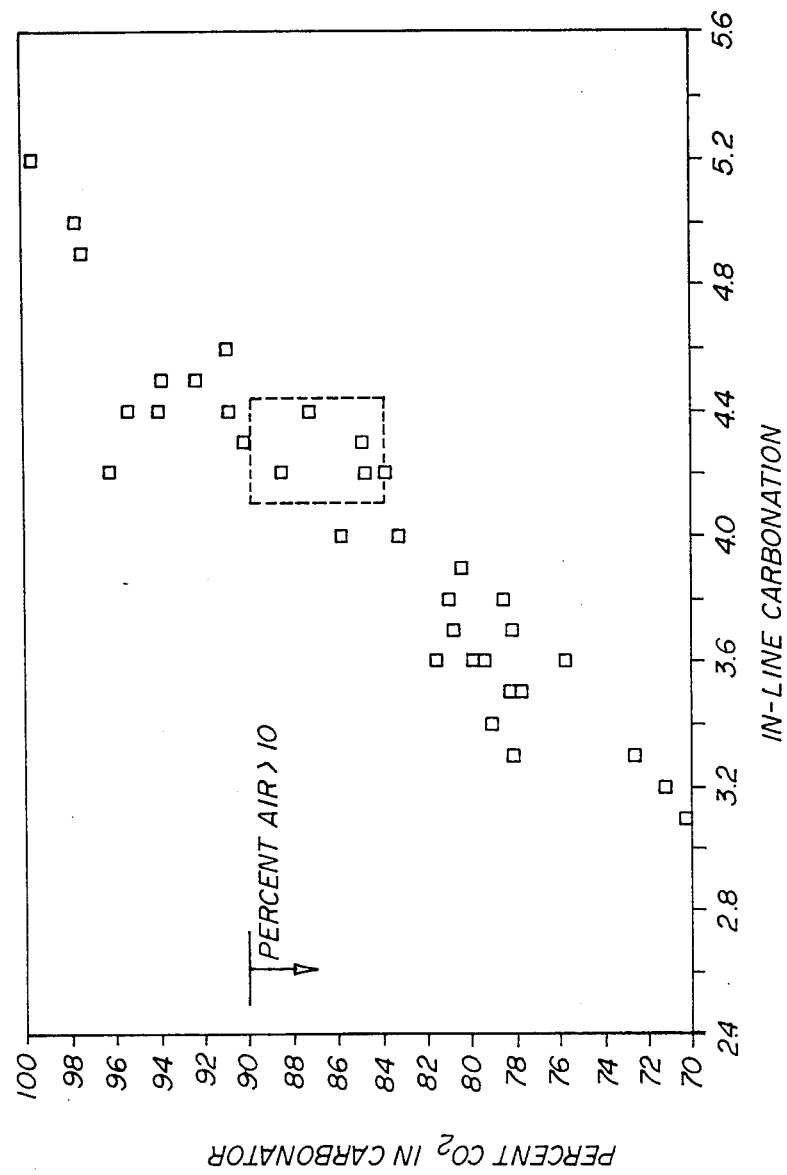
FIG. 2 is a graph showing percentage of $CO_2$ in a carbonator tank versus in-line carbonation.

FIG. 2 shown how the percentage of air relates to the in-line carbonation levels produced by a carbonator. Different carbonators and carbonator systems do not perform identically. In general, the in-line carbonation values of field samples were proportionately lower as the presence of air increased. Less than 17% of the samples, whose carbonators measured 10% or more air, produced carbonation volumes above 4.0.

Figure 3:
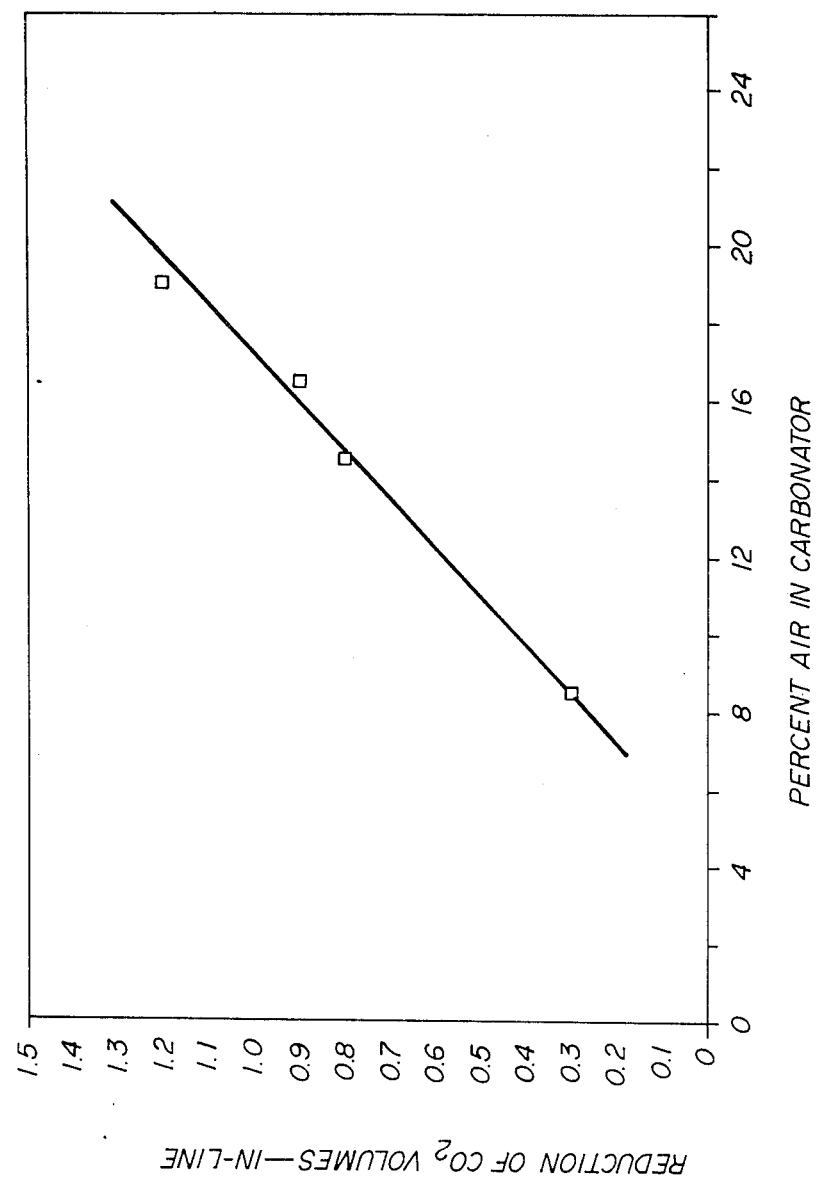
FIG. 3 is a graph showing reduction of $CO_2$ volumes-in-line versus percentage of air in a carbonator tank.

FIG. 3 shows how much reduction in carbonation values has been measured as the amount of air in the carbonator increases. As shown, a 20-25% level of air may reduce in-line carbonation by 1.0-1.5 volumes.

Figure 4:
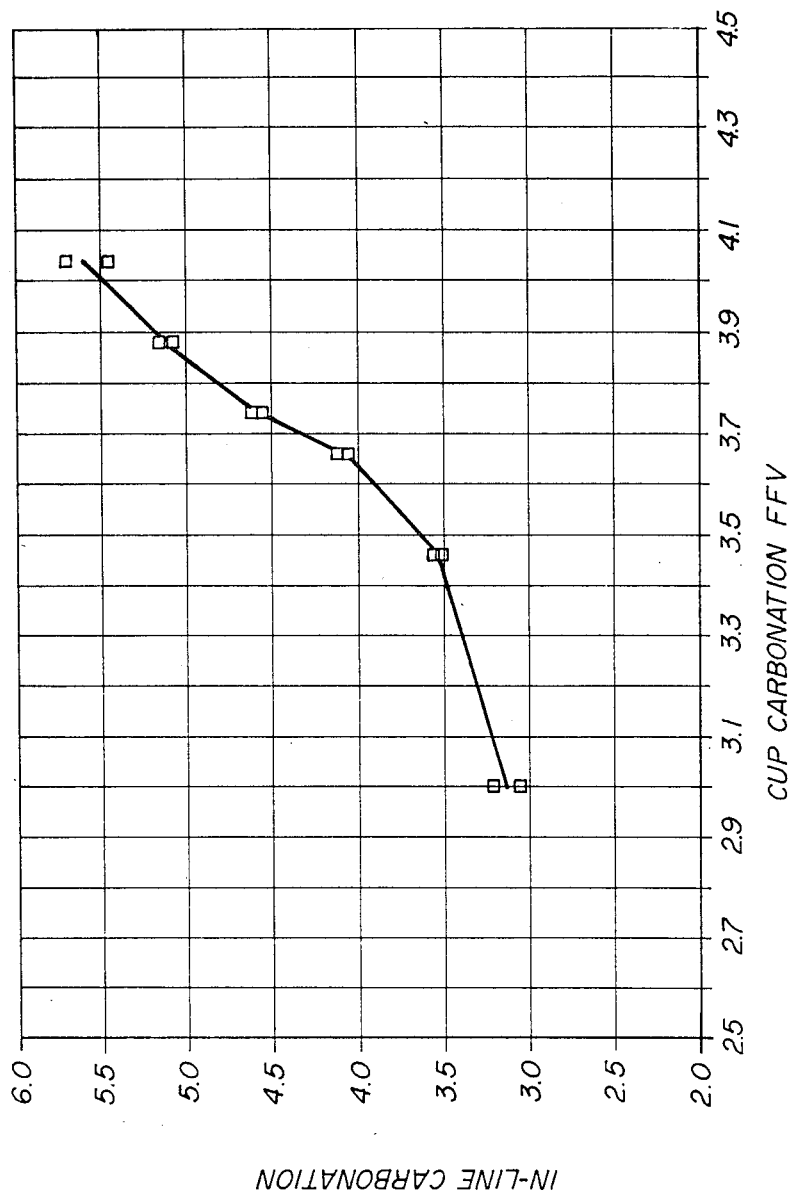
FIG. 4 is a graph showing in-line carbonation versus cup carbonation.

FIG. 4 shows how this affects cup carbonation. The amount of $CO_2$ breakout varies with the mechanics/hydraulics of the dispensing system. For a fast-flow valve (3 oz/sec.), a reduction of 1.2 volumes in the in-line carbonation may reduce cup carbonation by 0.5 volumes, i.e., assume 4.5 in-line yields 3.7 in cup, versus 3.3 in-line yields 3.2.

The method of the present invention had the following affect on a carbonator:
Field test data at one account showed:

| Percent $CO_2$ | | Carbonation Volumes | |
|---|---|---|---|
| Before Vent | After Vent | Before Vent | After Vent |
| 78.5 | 97.6 | 3.8 | 5.0 |
| 79.3 | 94.0 | 3.6 | 4.4 |
| 81.6 | 90.2 | 3.6 | 3.9 |
| 78.1 | 95.4 | 3.5 | 4.4 |

Laboratory testing has indicated to what levels a vented carbonator can reduce the amount of air. A vented carbonator can keep the air levels down under 5%, thereby maintaining 95% or higher carbonator efficiencies.

In a preferred embodiment of the present invention, the carbonator tank is vented to atmosphere twice a day, at 3:00 p.m. and 3:00 a.m. In an alternative embodiment, the tank is vented once every 100 cycles, for a time period of from one to five seconds. Alternatively, the number of cycles chosen to perform the venting can be from about 50 to 500.

While the preferred embodiments of this invention have been described above in detail, it is to be understood that variations and modifications can be made therein without departing from the spirit and scope of the present invention. For example, other predetermined times for opening the vent can be used, including once every cycle, for 1-2 seconds, for example. The timer or cycle counter can also be made adjustable so a single piece of equipment can be used for different locations, because the amount of air in the water varies from location to location. Also, the length of time of opening the vent can be made adjustable for the same reason. An alternative embodiment is to include a solenoid controlled valve in the $CO_2$ supply line to the carbonator tank and to close this valve during venting to save $CO_2$. In the embodiment in which the tank is vented each cycle, that is, each time the pump is turned on, the rate of gas removal through the vent is preferably controlled by a needle valve or no orifice, to maintain pressure on the carbonator tank. Many carbonators now have electronic level controls, so that it is an easy matter to build logic into the system to provide the automatic periodic venting of the present invention.

What is claimed is:

1. A method comprising:
   (a) improving carbonation in a beverage dispenser having a continuous carbonation system employing a carbonator including a carbonator tank for holding a sufficient quantity of water for a plurality of drinks and having a continuously pressurized gas headspace above the water;
   (b) said improving step including feeding $CO_2$ gas into said carbonator to maintain a continuously pressurized gas headspace above the water, automatically periodically venting said headspace to atmosphere, at predetermined times and for a predetermined length of time, and then feeding additional $CO_2$ gas into said carbonator under pressure.

2. The method as recited in claim 1 wherein said predetermined time is after a predetermined number of carbonating cycles.

3. The method as recited in claim 1 wherein said predetermined time is every predetermined number of minutes.

4. The method as recited in claim 1 wherein said predetermined length of time is from about one to five seconds.

5. A method comprising:
   (a) maintaining the efficiency in a continuous process beverage dispenser carbonator above about 95%, said carbonator holding a sufficient quantity of water for a plurality of drinks and having a continuously pressurized gas headspace above the water;
   (b) said maintaining step comprising feeding $CO_2$ gas into said carbonator to maintain a continuously pressurized gas headspace above the water, automatically periodically venting to atmosphere, at predetermined times and for a predetermined length of time, the headspace in said carbonator, and then feeding additional $CO_2$ gas into said carbonator under pressure.

6. The method as recited in claim 5 wherein said predetermined time is after a predetermined number of carbonating cycles.

7. The method as recited in claim 5 wherein said predetermined time is every predetermined number of minutes.

8. The method as recited in claim 5 wherein said predetermined length of time is from about one to five seconds.

9. A method comprising:
   (a) increasing in-line carbonation, in a continuous process beverage dispenser carbonator having a carbonator tank for holding a sufficient quantity of water for a plurality of drinks and having a continuously pressurized gas headspace above the water, by approximately 1.0-1.5 volumes;
   (b) said increasing step comprising feeding $CO_2$ gas into said carbonator to maintain a continuously pressurized gas headspace above the water, automatically periodically venting to atmosphere, at predetermined times, and for a predetermined length of time, the headspace in said carbonator, and then feeding additional $CO_2$ gas into said carbonator under pressure.

10. The method as recited in claim 9 wherein said predetermined time is after a predetermined number of carbonating cycles.

11. The method as recited in claim 9 wherein said predetermined time is every predetermined number of minutes.

12. The method as recited in claim 9 wherein said predetermined length of time is from about one to five seconds.

* * * * *